(12) United States Patent
Miyamoto et al.

(10) Patent No.: US 6,311,208 B1
(45) Date of Patent: *Oct. 30, 2001

(54) SERVER ADDRESS MANAGEMENT SYSTEM

(75) Inventors: Takahisa Miyamoto, Kawasaki; Sunao Sawada; Yoshikazu Tominaga, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,489

(22) Filed: Nov. 8, 1999

Related U.S. Application Data

(63) Continuation of application No. 08/893,686, filed on Jul. 11, 1997, now Pat. No. 6,014,753.

(30) Foreign Application Priority Data

Jul. 11, 1996 (JP) .................................................... 8-201347

(51) Int. Cl.⁷ .................................................... G06F 13/00

(52) U.S. Cl. .......................... 709/203; 709/224; 709/223; 370/403

(58) Field of Search .............................. 714/4; 709/218, 709/203, 200, 245, 202, 208, 223, 224, 226; 370/410, 396, 401, 60, 403

(56) References Cited

U.S. PATENT DOCUMENTS

| | | | |
|---|---|---|---|
| 4,163,280 | 7/1979 | Mori et al. ........................... | 364/200 |
| 4,710,868 | 12/1987 | Cocke et al. ........................ | 364/200 |
| 4,800,488 | * 1/1989 | Agrawal et al. .................... | 364/200 |
| 5,315,705 | 5/1994 | Iwami et al. ........................ | 395/200 |
| 5,425,026 | 6/1995 | Mori .................................... | 370/410 |
| 5,440,547 | * 8/1995 | Easki et al. .......................... | 370/60 |
| 5,537,401 | * 7/1996 | Tadamura et al. .................. | 370/60 |
| 5,555,375 | * 9/1996 | Sunada et al. ...................... | 709/200 |
| 5,572,533 | * 11/1996 | Sunada et al. ...................... | 371/20.1 |
| 5,581,552 | 12/1996 | Civanlar et al. .................... | 370/396 |
| 5,617,540 | 4/1997 | Civanlar et al. .................... | 395/200.11 |
| 5,748,626 | 5/1998 | Esaki et al. .......................... | 370/355 |
| 5,751,957 | * 5/1998 | Hiroya et al. ....................... | 709/203 |

(List continued on next page.)

OTHER PUBLICATIONS

IETF Internet Engineering Task Force, "Classical IP and ARP over ATM", M. Laubach, Hewlett–Packart Laboratories, Jan. 1993.

*Primary Examiner*—Thomas Lee
*Assistant Examiner*—Ri Jue Mai
(74) *Attorney, Agent, or Firm*—Antonelli, Terry, Stout & Kraus, LLP

(57) ABSTRACT

A method and system for entering the address of an address server to plural terminals connected to a switch, selecting a target address and switching to a substitute address server when a failure occurs in the target address server. In the invention when the switch is activated, its address management section generates a logical network table. Next when each terminal is activated, its address processing section generates a server address table and informs the switch of the address and the logical network of the terminal and whether the terminal is an address server. The address management section of the switch registers this information to logical network table. When another terminal is activated and informs the switch of its address and logical network, the address management section of the switch registers the information to its logical network table, and checks whether the address server of the other terminal has been registered. If the address server of the other terminal has been registered, the other terminal is informed of the address of the terminal and the address is registered to the other terminal. The other terminal informs the terminal of the address of the terminal other using the address of the terminal and the terminal registers this address.

10 Claims, 11 Drawing Sheets

U.S. PATENT DOCUMENTS

| | | | |
|---|---|---|---|
| 5,774,662 | 6/1998 | Sakagawa | 395/200.33 |
| 5,777,994 * | 7/1998 | Takihiro et al. | 370/395 |
| 5,819,036 | 10/1998 | Adams et al. | 709/203 |
| 5,822,320 * | 10/1998 | Horikawa et al. | 370/396 |
| 5,892,912 | 4/1999 | Suzuki et al. | 709/218 |
| 5,974,452 * | 10/1999 | Karapetkov et al. | 709/218 |
| 5,987,524 * | 11/1999 | Yoshida et al. | 709/245 |
| 5,999,536 * | 12/1999 | Kawafuji et al. | 370/401 |
| 6,014,753 * | 1/2000 | Miyamoto et al. | 714/4 |
| 6,016,319 * | 1/2000 | Kshirsagar et al. | 370/410 |
| 6,101,528 * | 8/2000 | Butt | 709/203 |
| 6,154,462 * | 11/2000 | Coden | 370/403 |

* cited by examiner

ADDRESS TABLE

| TERMINAL NAME | TERMINAL ADDRESS |
|---|---|
| TERMINAL B | ADDR2 |
| TERMINAL C | ADDR3 |

ADDRESS MANAGEMENT SECTION

LOGICAL NETWORK TABLE

| PORT NO. | TERMINAL ADDRESS | SERVER ADDRESS | LOGICAL NETWORK ID |
|---|---|---|---|
| 801 | 802 | 803 | 804 |

LOGICAL NETWORK TABLE 703

| PORT NO. | TERMINAL ADDRESS | SERVER ADDRESS | LOGICAL NETWORK ID | |
|---|---|---|---|---|
| 1 | ADDR 1 | ADDR 1 | NET 1 | 901 |
| 2 | ADDR 2 | ADDR 1 | NET 1 | 902 |
| 3 | ADDR 3 | ADDR 1 | NET 1 | 904 |

LOGICAL NETWORK TABLE

| PORT NO. | TERMINAL ADDRESS | SERVER ADDRESS | LOGICAL NETWORK ID | |
|---|---|---|---|---|
| 1 | ADDR1 | ADDR1 | NET1 | 1201 / 1202 |
| 2 | ADDR2 | ADDR2 | NET2 | 1203 |
| 3 | ADDR3 | ADDR1 | NET1 | 1204 |
| 4 | ADDR4 | ADDR2 | NET2 | 1205 |
| 5 | ADDR5 | ADDR1 | NET1 | 1206 |

LOGICAL NETWORK TABLE 1201

| PORT NO. | TERMINAL ADDRESS | SERVER ADDRESS | LOGICAL NETWORK ID |
|---|---|---|---|
| 1 | ADDR1 | FAILURE OCCURS | NET1 |
| 2 | ADDR2 | ADDR2 | NET2 |
| 3 | ADDR3 | ADDR1 → 3 | NET1 |
| 4 | ADDR4 | ADDR2 | NET2 |
| 5 | ADDR5 | ADDR1 → 3 | NET1 |

1202, 1203, 1204, 1205, 1206

LOGICAL NETWORK TABLE 1201

| PORT NO. | TERMINAL ADDRESS | SERVER ADDRESS | LOGICAL NETWORK ID |
|---|---|---|---|
| 1 | ADDR1 | ADDR1 | NET1 |
| 2 | ADDR2 | ADDR2 | NET2 |
| 3 | ADDR3 | ADDR3 → 1 | NET1 |
| 4 | ADDR4 | ADDR2 | NET2 |
| 5 | ADDR5 | ADDR3 → 1 | NET1 |

1202, 1203, 1204, 1205, 1206

ADDRESS PROCESSING SECTION

SERVER ADDRESS MANAGEMENT SYSTEM

This is a continuation of application U.S. Pat. Ser. No. 08/893,686, filed Jul. 11, 1997 now U.S. Pat. No. 6,014,753.

BACKGROUND OF THE INVENTION

The present invention relates to an asynchronous transfer mode (ATM) network. More particularly, the present invention relates to a server address management system in an ATM network for managing the addresses of communication terminals due to the nonbroadcast nature of the ATM network.

Currently, a network for connecting computers so that they communicate data to each other is widely used. Such a network is, for example, a local area network (LAN) which is used in an office and other environments on a relatively small scale and the Internet which is used between companies or nations on a relatively large (world-wide) scale. As these networks cannot directly communicate with a public network such as telephone lines, they have been widely used independent of the public network.

Recently an asynchronous transfer mode (ATM) which will enable direct communication between the above-described networks and a public network has been researched and developed. A network operated according to an ATM (hereinafter called ATM network) is a nonbroadcast system in which broadcast communication is not possible different than existing LAN's such as Ethernet (the registered trademark of Xerox Corporation).

FIGS. 2 to 6 illustrate an example in which in a nonbroadcast system the terminals do not know the identifier (hereinafter called address) used for communication between the terminals. First, referring to FIG. 2, system configuration will be described. A terminal A 201 is an information processing system such as a personal computer (PC) and a workstation (WS) for managing the address of terminals (terminals B 203 and C 204 in this example) in a system and ADDR1 is allocated to the terminal A as its address. The terminal A is provided with an address table 206 illustrated in FIG. 3 in which a terminal name 301 (IP address in TCP/IP network) and a terminal address 302 are stored and functions as an address server.

The terminals B 203 and C 204 are information devices such as a PC or a WS which communicate with another terminal in the system and ADDR2 and ADDR3 are respectively allocated as their addresses. SW 202 is communication equipment for connecting terminals in the system via communication wire 207 and switching a communication path and is equivalent to a switching system in a public network. The communication wire 207 connects each terminal and SW 202. A twisted pair cable or an optical fiber are examples of communication wire 207.

Next, referring to FIGS. 4 to 6, an example in which the terminal B 203 communicates with the terminal C 204 will be described. This example is known as address resolving as described in "Classical IP and ARP over ATM", by M. Lauback, Internet Engineering Task Force, Network Working Group Request for Comments; 1577 Category: Standards Track, January 1994, pp 1–17.

As the terminal B 203 not provided with an address table does not know the address of another terminal in the system, it cannot communicate with the other terminal. The reason why only the address server 201 is provided with the address table 206 is that if an address table is distributed, it is difficult to match table information and that in the case of a large-scale system including many terminals, a workload for generating a table is enormous.

Therefore, the terminal B 203 inquires of the address of the terminal C 204 to the address server 201 which manages an address. However, as the terminal B 203 does not also know the address of the address server 201 while it is activated, any of the following three methods is executed:

(1) An operator enters the address (ADDR1) of the address server 201 in the terminal B 203 as shown in FIG. 4.

(2) The address of the address server 201 is stored in the terminal B 203 and the address is used.

(3) The terminal B 203 communicates using a fixed address (a well-known address) and SW 202 converts it to the actual address of the address server 201.

In an ATM network the above methods (1) and (2) are mainly used and method (3) is used for LAN emulation which is one of the communication modes of ATM network. The terminal B 203 which obtains the address of the address server 201 according to the above method requests the address server 201 to provide to it the address of the terminal C 204.

The address server 201 which receives the request checks the address table 206 and sends ADDR3 which is the address of the terminal C 204 to the terminal B 203 as a response as shown in FIG. 5. The terminal B 203 which receives the address (ADDR3) of the terminal C 204 communicates with the terminal C 204 using the address as shown in FIG. 6.

The above example illustrates the following problems which exist in conventional technology.

(1) When the address of an address server is entered manually in each terminal, the work load of the operator increases in proportion to the number of terminals.

(2) If plural address servers are added to a system when the address of a particular address server is stored or a well-known address is used, the added address servers cannot be selected until modifications to the system are made.

(3) If a failure occurs in an address server, another terminal cannot take over the function of the failed address server as a substitute server until the address of the substitute server has been registered in each terminal.

SUMMARY OF THE INVENTION

The present invention provides an address server for use in a communication system wherein the address server collectively manages addresses each of which is the identification for communication to a terminal in a network of a nonbroadcast system type. The present invention includes an address management section for managing the address of the address server, wherein the address management section is provided in a switch (SW) for connecting each terminal, and an address processing section is provided in each terminal and the address server for registering and obtaining the address of the address server.

The address processing section of the address server sends the address of the address server to the switch. The address management section of the switch registers the received address of the address server in a first table included in the switch and sends the address of the address server to each of the terminals in response to an address from each terminal. The address processing section of each terminal sends its address to the switch and registers the address of the address server sent from the switch in a second table. The address management section of the switch receives the terminal address sent from each terminal and registers it in the first table.

Thus, according to the present invention each terminal obtains the address of the address server without it being previously set and requests the address server to receive its address.

According to the present invention, a third table is provided in the address server. The address processing section of each terminal sends its address to the address server based upon the registered address of the address server and the address processing section of the address server registers the address sent from the terminal in the third table.

The first table of the address management section of the above switch is a logical network table for registering each terminal in units of a logical network in which terminals in a network are logically grouped. The address management section registers and manages the address of the address server and each terminal in units of the logical network and sends the address of an address server which belongs to the same logical network as a terminal to the terminal when the address of the terminal is received from the address processing section of the terminal.

The above address management section is provided with a table processing section for initializing, registering, updating and retrieving the above logical network table and a request processing section for sending or receiving a request to/from each terminal. The request processing section receives the address of a terminal sent from the terminal when the terminal is activated. The table processing section registers the received address of the terminal and retrieves an address server which belongs to the same logical network as the terminal. If such an address server exists, the request processing section sends the address of the address server to the terminal.

The above address management section is provided with a table processing section for retrieving information of whether the address server is already registered in the logical network table or not and a request processing section for sending the address of the address server which is the result of retrieval to each terminal. The request processing section receives the address sent from the address server when the address server is activated. The table processing section registers the received address of the address server, retrieves an already registered terminal which belongs to the same logical network as the address server and if such a terminal exists, the request processing section sends the address of the address server to the terminal.

The above address processing section can be provided with an address server table in which the address of the address server is stored. The address processing section sends the address of the terminal to the switch when the terminal is activated and in response the switch sends the address of the address server to the terminal. The address of the address server from the switch is stored in the address server table. Thus, the address of the address server is obtained from the switch only when a terminal is activated.

The above address processing section can be provided with an address server table in which the address of the address server is stored. The address processing section receives address modification information of the address server from the switch, updates the contents of the address server table and modifies the address of the address server into an address of another address server without registering the address of the other address server to each terminal.

Also, if the switch detects that a failure occurs in the address server, the above address management section selects an arbitrary terminal connected to the switch, requests the selected terminal to substitute for the address server, informs all terminals in the same logical network of the modification of an address server when the address management section receives a response showing that substitution is accepted and modifies the address of the address server into an address of another terminal without registering a the address of the other address server to each terminal. When the above address management section receives a response showing that substitution is not accepted from the selected terminal, it sequentially selects another arbitrary terminal from the other terminals connected to the switch and requests the selected terminal to substitute for the address server until it receives a response indicating that substitution is accepted from the selected terminal.

Further, if the switch detects that a failure of the address server in which a failure occurs recovers, the above address management section requests the terminal which functions as an address server to terminate substitution, informs all terminals in the same logical network of the modification of an address server and terminates the substitution of an address server without registering a new address server to each terminal. Also, if the switch detects that a failure occurs in the address server, the above address management section selects one of the address servers in another logical network connected to the switch, requests the selected address server to substitute for the address server in which the failure occurs, informs all terminals in the same logical network of the modification of an address server when it receives a response showing that substitution is accepted and substitute the address of substitute address server for the failed address server without registering an address of the substitute address server to each terminal.

Further, if the switch detects that the failure of the address server in which the failure occurs recovers, the above address management section requests the substitute address server to terminate substitution, informs all terminals in the same logical network of the modification of an address server and terminates substitution without registering an address of the substitute address server to each terminal.

Another embodiment of the present invention provides that the first address server connected to the switch for a particular subnetwork is designated as the primary address server and the second address server connected to the switch for the same subnetwork is designated as the secondary address server and so on. An alternative embodiment of the present invention provides that each address server as it is connected to the switch for a particular subnetwork would indicate whether it is a primary or a secondary address server.

Yet another embodiment of the present invention includes plural address servers and logical networks and plural switches. This embodiment of the present invention provides a first switch to which a first address server and a plurality of first terminals are connected and a second switch to which a second address server and a plurality of second terminals are connected. The first and second switches are connected to each other via respective ports and allow for communication between a first terminal connected to the first switch and a second terminal connected to the second switches.

In this embodiment of the present invention, for example, when a first terminal connected to the first switch seeks to send data to a second terminal connected to the second switch, the following steps are performed. First a request for the address of the second terminal connected to the second switch is sent to the first switch. The first switch upon receipt of the request determines that the addresses of the second terminal connected to the second switch nor the address of the second address server of the second terminal are stored therein. Therefore, the first switch sends the request via the ports to the second switch. The second switch responds to the request from the first switch by providing the address of the second address server for the second terminal connected to the second switch. The first terminal connected to the first switch upon receipt of the address of the second address server for the second terminal connected retrieves the address of the second terminal from the second address server. Thereafter the first terminal connected to the first switch sends the data to the second terminal connected to the second switch using the address of the second terminal retrieved from the second address server.

Still yet another embodiment of the present invention provides that all of the above-described functions of the address server are included in the switch. Such a construction reduces the amount of hardware necessary to implement the present invention.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

An embodiment according to the present invention will be described below.

First, referring to FIGS. 1, 3, 7, 8, 9, 10 17 and 18, an example in which the present invention is applied to a system including one address server and a logical network will be described.

Figure 1:
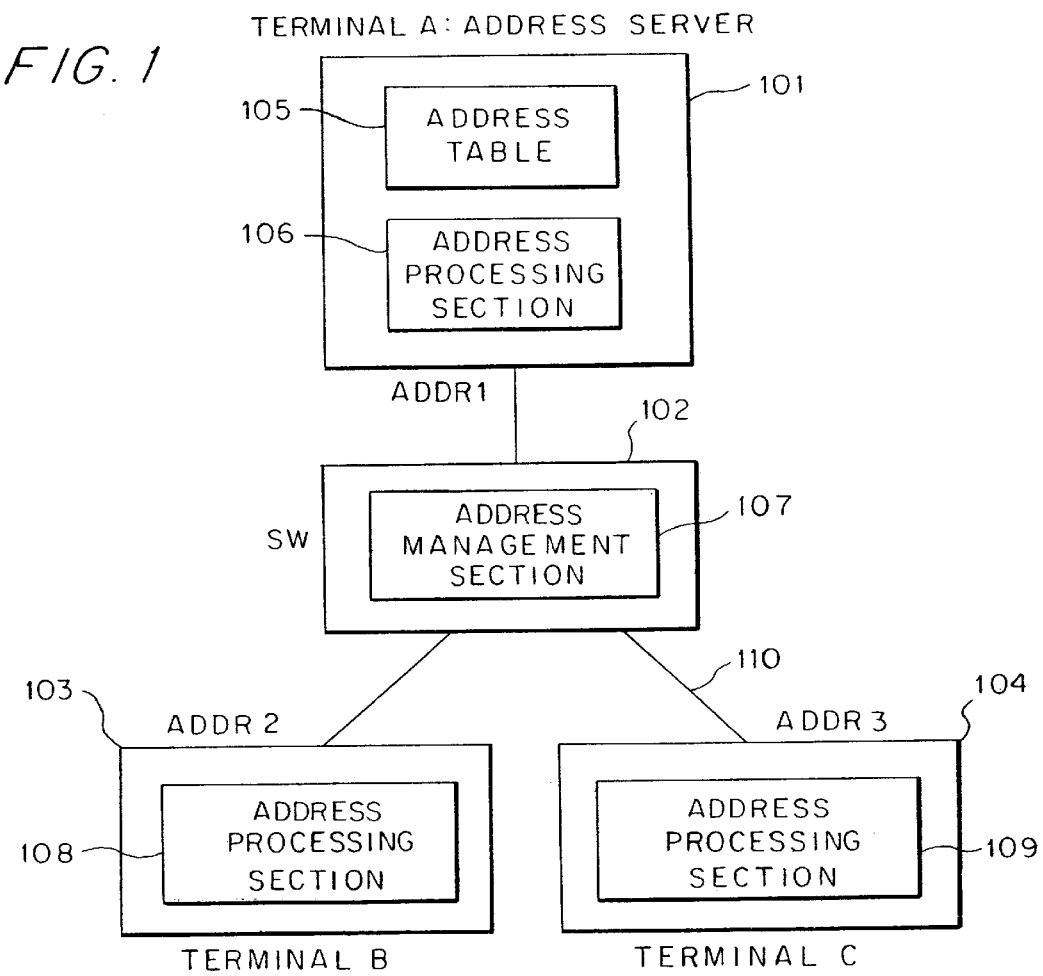
FIG. 1 illustrates a system configuration according to the present invention.
Figure 2:
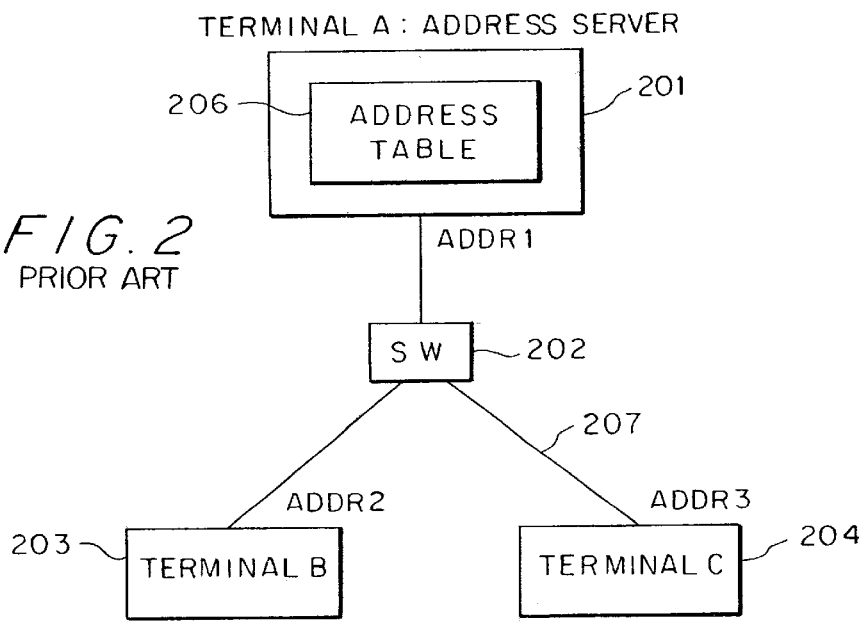
FIG. 2 illustrates a system configuration according to the conventional technology.

Referring to FIG. 1, a system configuration in this embodiment will be described below.

Figures 3, 4:
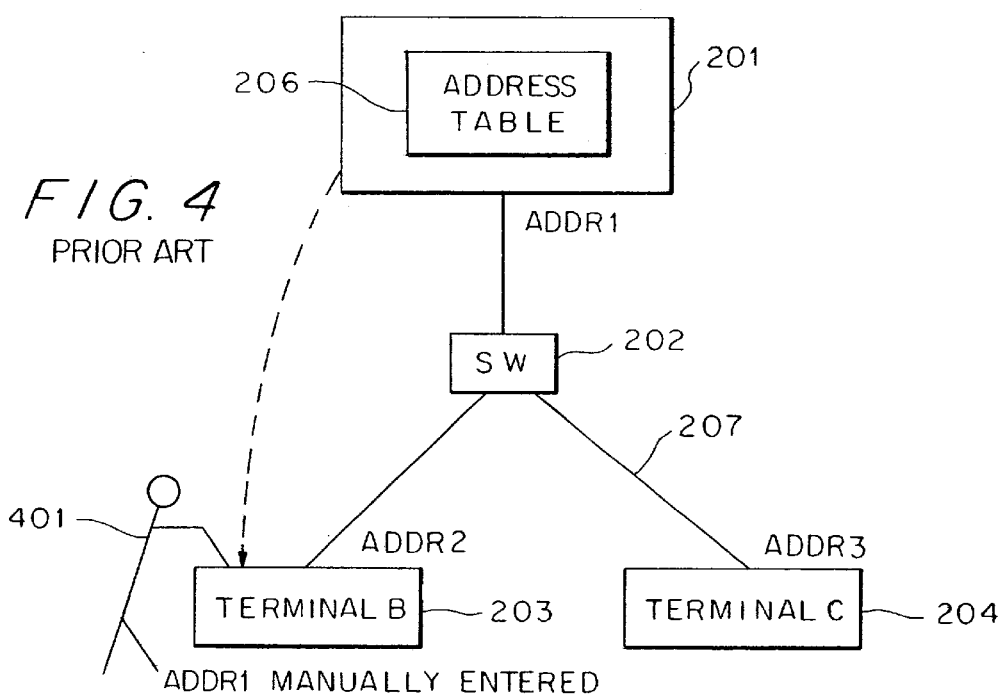
FIG. 3 illustrates the contents of an address table in conventional technology.
FIG. 4 illustrates that an operator manually enters the address of an address server in the conventional technology.
Figure 5:
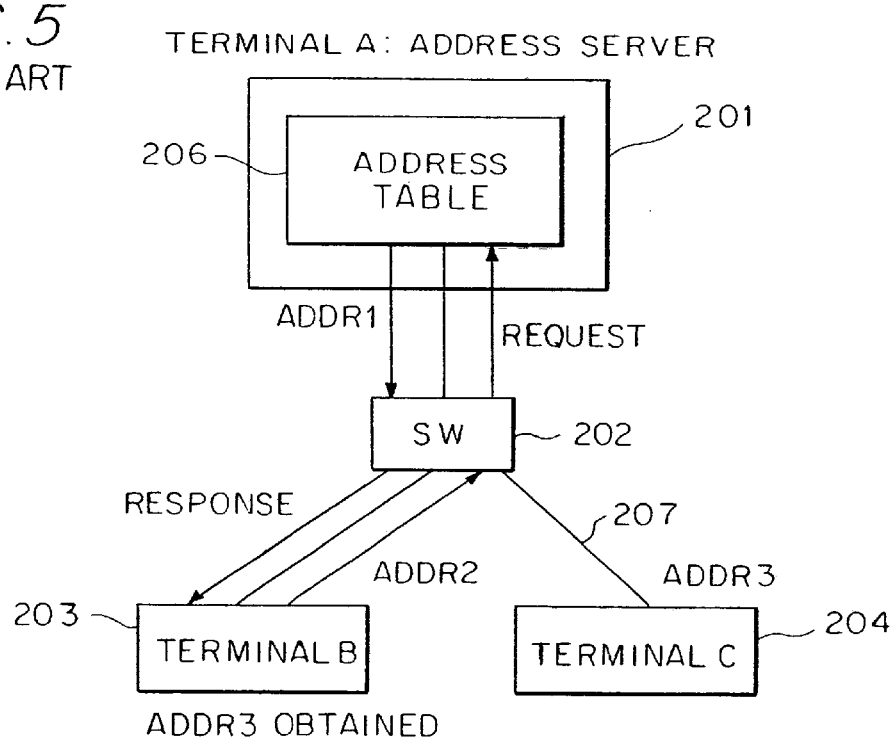
FIG. 5 illustrates the sending of a request to an address server and receiving a response from the address server in the conventional technology.
Figure 6:
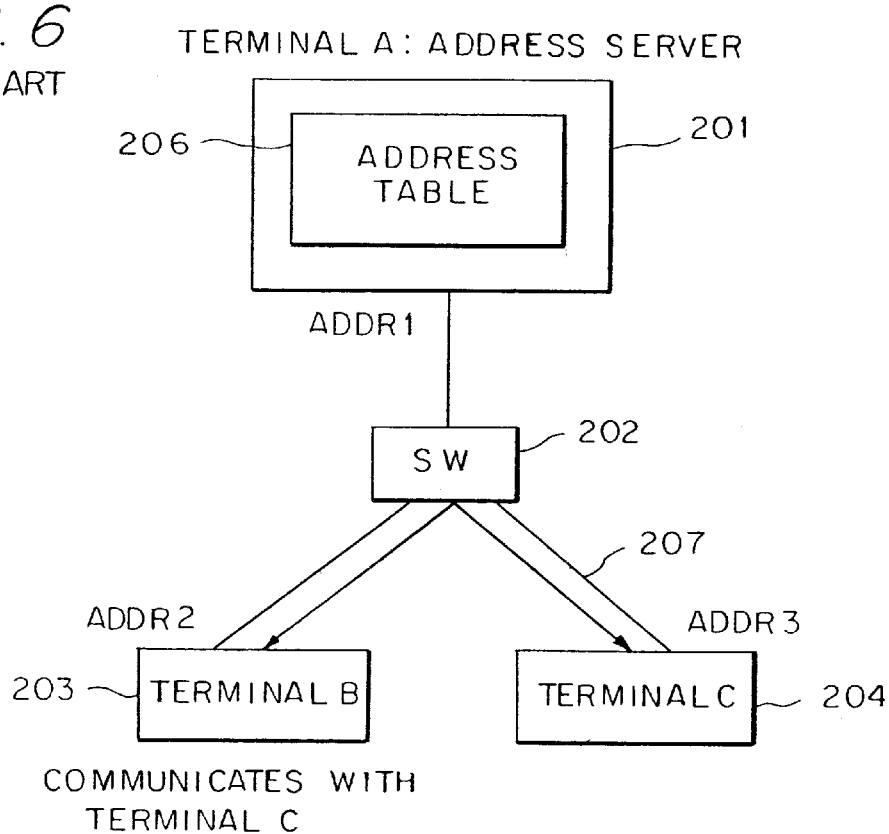
FIG. 6 illustrates communication between terminals B and C in the conventional technology.

A terminal A 101 is an information device such as PC and WS for managing the address of a terminal (terminals B 103 and C 104 in this embodiment) in a system and ADDR1 is allocated to the terminal A as its address. The terminal A is provided with an address table 105 in which the name of terminals in the system and their addresses are stored and an address processing section 106 for informing SW 102 that the terminal A 101 is an address server and functions as an address server. In this embodiment, the address table 105 is constructed as shown in FIG. 3.

Figures 15, 16, 17:
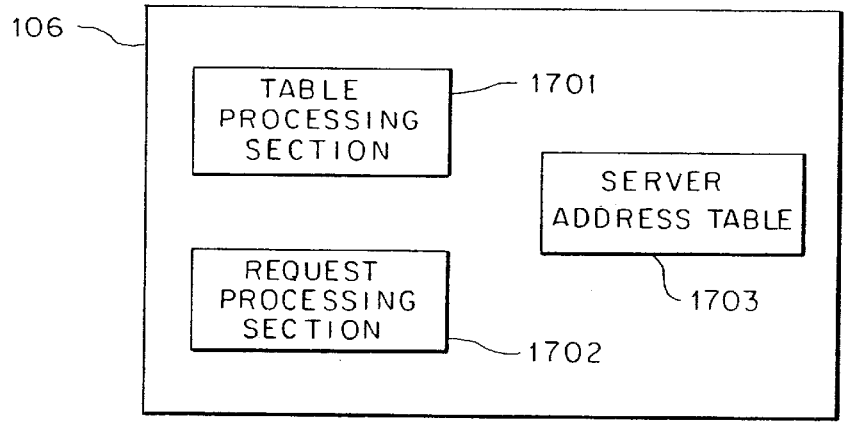
FIG. 15 illustrates the contents of a logical network table when a failure occurs in the system illustrated in FIG. 13.
FIG. 16 illustrates the contents of the logical network table after the failure recovers in the system illustrated in FIG. 13.
FIG. 17 illustrates the contents of an address processing section

Referring to FIG. 17, the address processing section 106 will be described below. The address processing section 106 comprises a server address table 1703 for registering the address of the address server 101 which is the sending destination of a request for an address from each terminal, a table processing section 1701 for constructing, registering and updating the server address table 1703 and a request processing section 1702 for sending or receiving a request to/from SW 102.

The terminals B 103 and C 104 are information processing systems such as a PC or WS for communicating with a terminal in the system and ADDR2 and ADDR3 are respectively allocated as their addresses. The terminals B 103 and C 104 are respectively provided with address processing sections 108 and 109 for obtaining the address of the address server 101 from SW 102.

The address processing sections 108 and 109 are similar to the address processing section 106.

SW 102 is communication equipment for connecting a terminal in the system to the port of SW 102 via communication wire 110 and switching a communication path. In this embodiment, the address server 101 (terminal A) is connected to a port 1, the terminal B 103 is connected to a port 2 and the terminal C 104 is connected to a port 3. SW 102 is provided with an address management section 107 for receiving various requests from the address server 101 (terminal A) and informing each terminal of the address of the address server 101 (terminal A).

Figures 7, 8, 9:
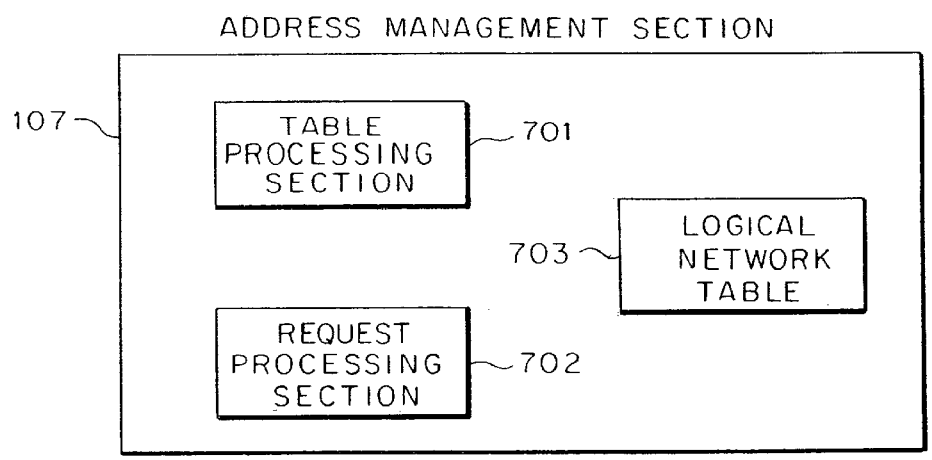
FIG. 7 illustrates the contents of an address management section.
FIG. 8 illustrates the contents of each entry in a logical network table.
FIG. 9 illustrates the logical network table of the system illustrated in FIG. 1.

Referring to FIGS. 7 to 9, the address management section 107 will be described below.

The address management section 107 includes a logical network table 703 for storing the address of a terminal in a system (terminal address 802), the address of an address server 101 which is the sending destination of a request for the address of the terminal (server address 803), the identifier of a logical network (logical network ID 804) to which the terminal and the address server 101 belong in units of port 801 via which each terminal is connected, a table processing section 701 for initializing, registering, updating and retrieving the logical network table 703 and a request processing section 702 for sending or receiving a request to/from each terminal.

In this embodiment, as only one address server 101 exists, only one logical network exists and logical network ID is NET1.

Therefore, in the logical network table 703 shown in FIG. 9, in the field of a port 1 (901) terminal address of ADDR1, server address of ADDR1 and logical network ID of NET1 are stored. In the field of a port 2 (902) terminal address of ADDR2, server address of ADDR1 and logical network ID of NET1 are stored. In the field of a port 3 (903) terminal address of ADDR3, server address of ADDR1 and logical network ID of NET1 are stored. Communication wire 110 such as a twisted pair cable or an optical fiber connects each terminal and SW 102.

Next, referring to FIG. 10, the flow of processing in this embodiment will be described.

When SW 102 is activated, the address management section 107 of SW 102 generates a logical network table 703 in the address management section 107 at initialization. As the number of entries in the logical network table 703 is equivalent to the number of ports of SW 102, the number of entries is 3 in this embodiment.

Next, when a terminal A 101 is activated, the address processing section 106 of the terminal A 101 generates a server address table 1703 in the address processing section 106 at initialization. Next, the request processing section 1702 in the address processing section 106 of the terminal A 101 informs SW 102 of the address (ADDR1) of the terminal A 101 and logical network ID (NET1) and that the terminal A 101 is an address server via the communication wire 110.

When the request processing section 702 in the address management section 107 of SW 102 receives the information from the terminal A 101, the table processing section 701 of SW 102 registers the address (ADDR1) of the terminal A 101, server address (ADDR1) and logical network ID (NET1) in the field of the port 1 in the logical network table 703. When registration is completed, the request processing section 702 sends a response to the terminal A 101.

Next, the table processing section 701 in the address management section 107 of SW 102 retrieves information indicating whether logical network ID (NET1) of the logical network to which the terminal A 101, which requested registration as a server, belongs and terminals of the same logical network ID are registered in the logical network table 703. As they are not registered as shown in FIG. 10, registration of the address server 101 (terminal A) to SW 102 is completed. The case where they are registered will be described later, referring to FIG. 18.

Next, when a terminal B 103 is activated, the address processing section 108 of the terminal B 103 generates a server address table 1703 in the address processing section 108 at initialization. Next, the request processing section 1702 in the address processing section 108 of the terminal B 103 informs SW 102 of the address (ADDR2) of the terminal B 103 and logical network ID (NET1) via the communication wire 110.

When the request processing section 702 in the address management section 107 of SW 102 receives the information from the terminal B 103, the table processing section 701 registers the address (ADDR2) 802 of the terminal B 103 and logical network ID (NET1) 804 in the field of the port 2 in the logical network table 703. When registration is completed, the table processing section 701 retrieves information indicating whether the address server 101 (terminal A) has already been registered or not based upon the same logical network ID (NET1) as that of the terminal B 103 from the logical network table 703.

Figure 10:
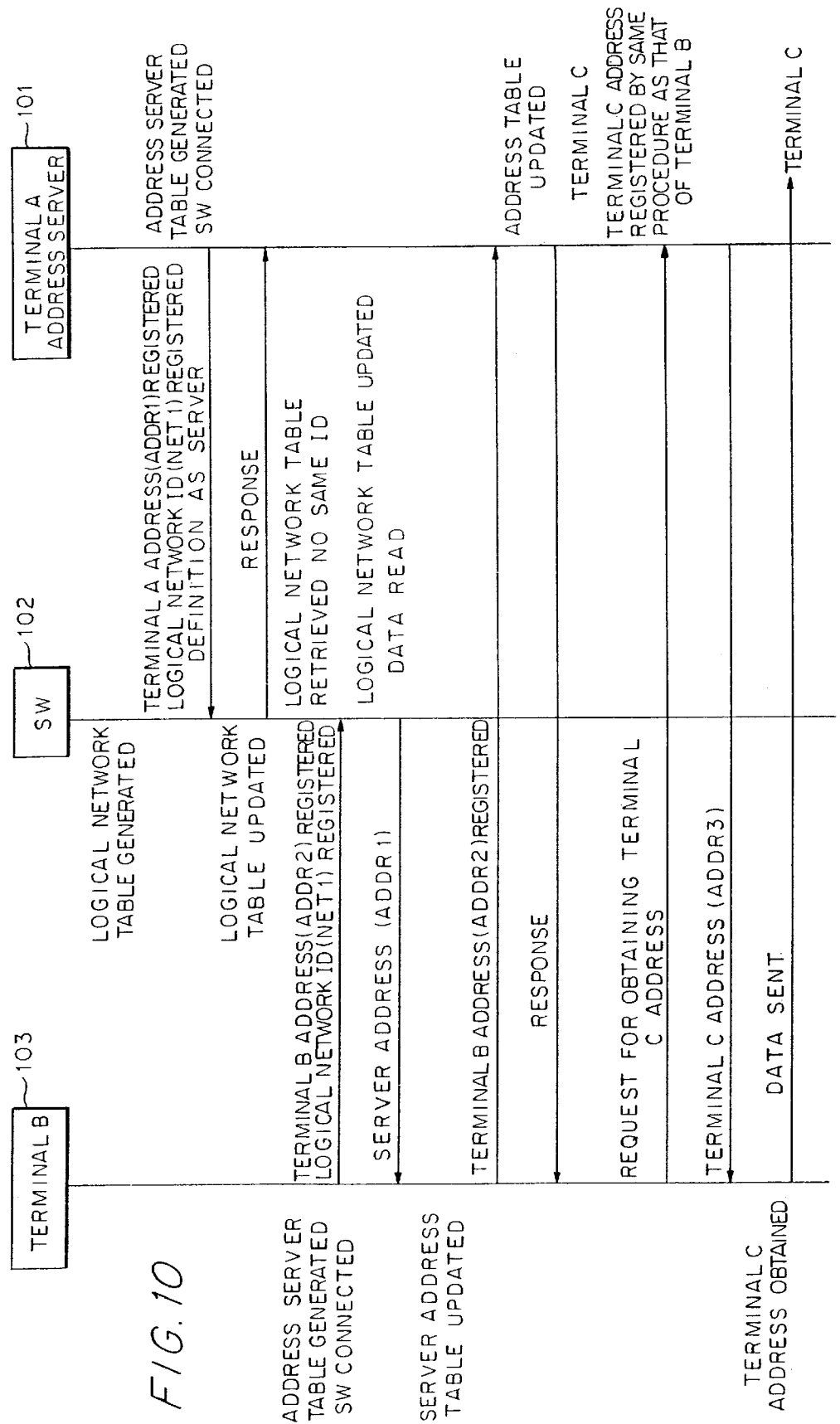
FIG. 10 illustrates the flow of processing of the system illustrated in FIG. 1.

As the address server 101 (terminal A) of the ID (NET1) has been registered in the example shown in FIG. 10, the server address (ADDR1) of the address server 101 is registered in the field of server address 803 in the entry (port 2) of the terminal B 103 in the logical network table and the request processing section 702 informs the terminal B 103 of the address (ADDR1) of the address server 101 via the communication wire 110.

When the request processing section 1702 in the address management section 108 of the terminal B 103 receives the information from SW 102, the table processing section 1701 registers the address (ADDR1) of the address server 101 (terminal A) in the server address table 1703. Thus, registration of the terminal B 103 to SW 102 and obtaining the address of the address server 101 (terminal A) have been completed.

In the case where the address of the address server 101 (terminal A) has not been registered, when the terminal B 103 is activated will be described below, referring to FIG. 18.

When the terminal B 103 is activated, the address processing section 108 of the terminal B 103 generates a server address table 1703 in the address processing section 108 at initialization. Next, the request processing section 1702 in the address processing section 108 of the terminal B 103 informs SW 102 of the address (ADDR2) of the terminal B 103 and logical network ID (NET1) via the communication wire 110.

The request processing section 702 in the address management section 107 of SW 102 which receives the information from the terminal B 103 registers the address (ADDR2) of the terminal B 103 and logical network ID (NET1) in the field of the port 2 in the logical network table 703. When registration has been completed, the table processing section 701 retrieves an entry which has been registered based upon the same logical network ID as that of the terminal B 103 from the logical network table 703.

Figure 18:
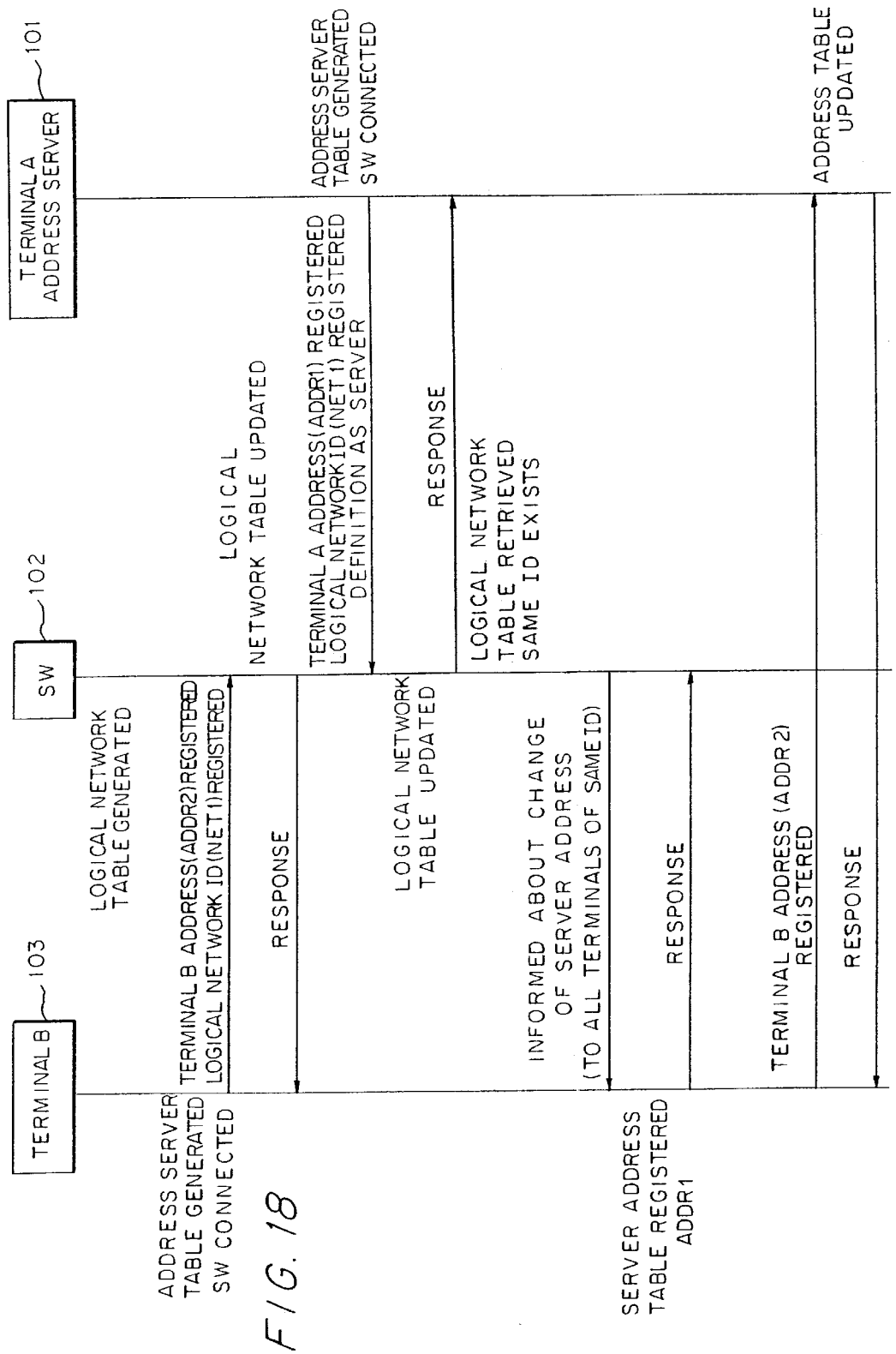
FIG. 18 illustrates the flow of processing when the activation of an address server is delayed in the system illustrated in FIG. 1.

As the server address has not been registered based upon the ID as shown in FIG. 18, the request processing section 702 responds to the information from terminal B 103 via the communication wire 110 and registration of the terminal B 103 to SW 102 is completed.

Next, when the terminal A 101 which is an address server is activated, the address processing section 106 of the terminal A 101 generates a server address table 1703 in the address processing section 106 at initialization. Next, the request processing section 1702 in the address processing section 106 of the terminal A 101 informs SW 102 of the address (ADDR1) of the terminal A 101 and logical network ID (NET1) and that the terminal A 101 is an address server via the communication wire 110.

When the request processing section 702 in the address management section 107 of SW 102 receives the information from the terminal A 101, the table processing section 701 registers the address (ADDR1) of the terminal A 101, address of the address server 101 (ADDR1) and logical network ID (NET1) in the field of the port 1 in the logical network table 703. When registration has been completed, the request processing section 702 sends a response to the terminal A 101.

The table processing section 701 in the address management section 107 of SW 102 retrieves information indicating whether a terminal of the same logical network ID as the logical network ID (NET1) of the logical network to which the terminal A 101, which has been registered as a new server belongs, has been registered in the logical network table 703.

As the terminal B 103 has been registered as shown in FIG. 18, the request processing section 702 informs the terminal B 103 of the address (ADDR1) of the address server 101 (terminal A). If another terminal of the same ID is also registered, the terminal is also informed of the address (ADDR1) of the address server 101 (terminal A).

When the request processing section 1702 in the address processing section 108 of the terminal B 103 receives the information, the table processing section 1701 registers the address (ADDR1) of the terminal A 101 in the server address table 1703 and the request processing section 1702 sends a response to SW 102. When the request receiving section 703 in the address management section 107 of SW 102 receives the response, registration of the terminal A 101 to SW 102 is completed.

As shown in FIG. 10, the table processing section 701 in the address management section 107 of SW 102 retrieves information indicating whether another terminal of the same logical network ID (NET1) as the terminal A 101 has been registered from the logical network table 703. The processing when another terminal has been registered is equivalent to processing for informing of the address of the address server from SW 102 to the terminal B 103 shown in FIG. 18.

As shown in FIGS. 10 and 18, when the terminal B 103 obtains the address (ADDR1) of the address server 101 (terminal A), it sends a request to register its own address (ADDR2) to the address server 101 (terminal A). The address server 101 (terminal A) which receives the request for registration registers the name and address (ADDR2) of the terminal B 103 in the address table 105 and sends a response to the terminal B 103.

When the terminal B 103 receives the response from the terminal A 101, processing for registering the address of the terminal B 103 to the address server 101 (terminal A) is finished. If the terminal B 103 sends data to a terminal C 104, the table processing section 1701 of the address processing section 108 reads the address (ADDR1) of the address server 101 (terminal A) from the server address table 1703 and sends a request to obtain the address of the terminal C 104 to the address server 101 (terminal A) as shown in FIG. 10.

The address server 101 (terminal A) which receives the request reads the address (ADDR3) of terminal C 104 from the address table 105 and sends the address (ADDR3) of terminal C 104 to the terminal B 103. The terminal B 103 which receives the address (ADDR3) of the terminal C 104 sends data to the terminal C 104 using the address (ADDR3) and a series of processings are finished.

Figures 11, 12:
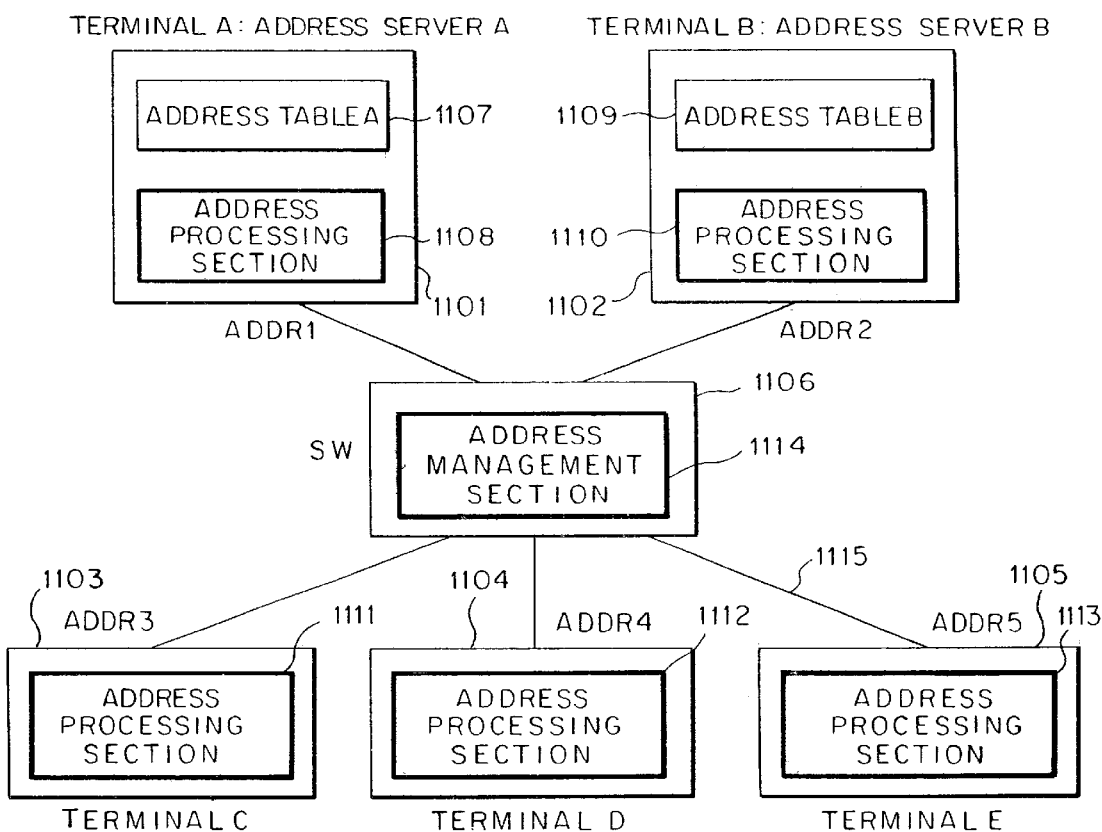
FIG. 11 illustrates a system configuration where the present invention is applied to a system including plural address servers.
FIG. 12 illustrates the logical network table of the system illustrated in FIG. 11.

Next, an example in which the present invention is applied to a system including plural address servers and logical networks will be described, referring to FIGS. 11 and 12. FIG. 11 illustrate a system configuration of this embodiment.

A terminal A 1101 is an information processing system such as PC or a WS for managing the address of a terminal (terminals C 1103 and E 1105 in this embodiment) of the same logical network ID (NET1) of terminals in a system and ADDR1 is allocated as its address. A terminal B 1102 is an information processing system such as PC or a WS for managing the address of a terminal (a terminal D 1104 in this embodiment) of the same logical network ID (NET2) of terminals in the system and ADDR2 is allocated as its address.

Both terminals A 1101 and B 1102 are respectively provided with address tables A 1107 and B 1109 for storing the names and addresses of terminals in the respective logical networks and address processing sections 1108 and 1110 for informing SW 1106 that the terminal is an address server, and respectively function as an address server. The address processing sections 1108 and 1110 are similar to those described in relation to FIG. 17.

The terminals C 1103, D 1104 and E 1105 are information processing systems such as PC or a WS for communicating with a terminal in the system and ADDR3, ADDR4 and ADDR5 are respectively allocated as their addresses. In this embodiment, the terminals C 1103 and E 1105 are provided with the same logical network ID (NET1) as that of the address server A 1101 (terminal A) and the terminal D 1104 is provided with the same logical network ID (NET2) as that of the address server B 1102 (terminal B). The terminals C 1103, D 1104 and E 1105 are respectively provided with address processing sections 1111, 1112 and 1113 for obtaining the address of the address server from SW 1106.

SW 1106 is communication equipment for connecting each terminal in the system to the port of SW 1106 via communication wire 1115 and switching a communication path. In this embodiment, for the port of SW 1106, the address server A 1101 (terminal A) is connected to a port 1, the address server B 1102 (terminal B) is connected to a port 2, the terminal C 1103 is connected to a port 3, the terminal D 1104 is connected to a port 4 and the terminal E 1105 is connected to a port 5. SW 1106 is provided with an address management section 1114 for receiving various requests from each address server and informing each terminal of the address of an address server. The address management section 1114 is similar to that described in relation to FIGS. 7 and 8. In this embodiment, data is registered based upon the entries of port 1 (1202), port 2 (1203), port 3 (1204) and port 4 (1205), port 5 (1206) in a logical network table 1201 as shown in FIG. 12. The communication wire 1115 such as a twisted pair cable or an optical fiber connects each terminal and SW 1106.

Communication between each terminal and SW 1106 or between each terminal is performed as described in relation to FIGS. 10 and 18. As a result, a terminal (the terminals C 1103 and E 1105) provided with logical network ID (NET1) inquires of the addresses stored in the address server A 1101 (terminal A) and a terminal (terminal D 1104) provided with logical network ID (NET2) inquires of the addresses stored in the address server B 1102 (terminal B) so as to enable sending/receiving of data to/from each terminal.

Figure 13:
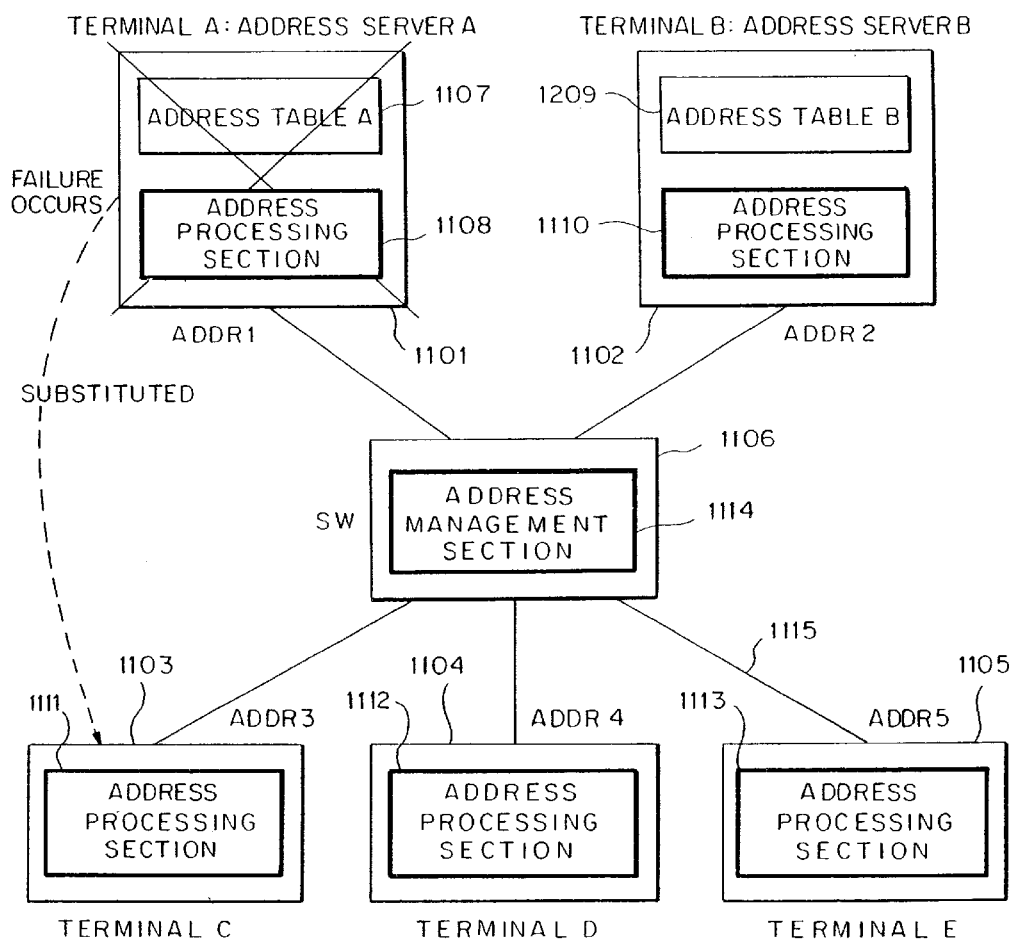
FIG. 13 illustrates a system configuration when the present invention is applied to a system including plural address servers and a failure occurs in one of the address servers.

Next, an example in which the present invention is applied to a system including plural address servers and logical networks and where a failure occurs in one of the plural address servers will be described, referring to FIGS. 13 to 16. This embodiment is equivalent to an example in which a failure occurs in an address server A 1101 (terminal A) and a terminal C 1103 functions as a substitute address server in place of the address server A 1101 (terminal A) as shown in FIG. 13. The construction and processing other than the functions to be described below are similar to the description in relation to FIGS. 7, 8, 10, 11, 12, 17 and 18.

Figure 14:
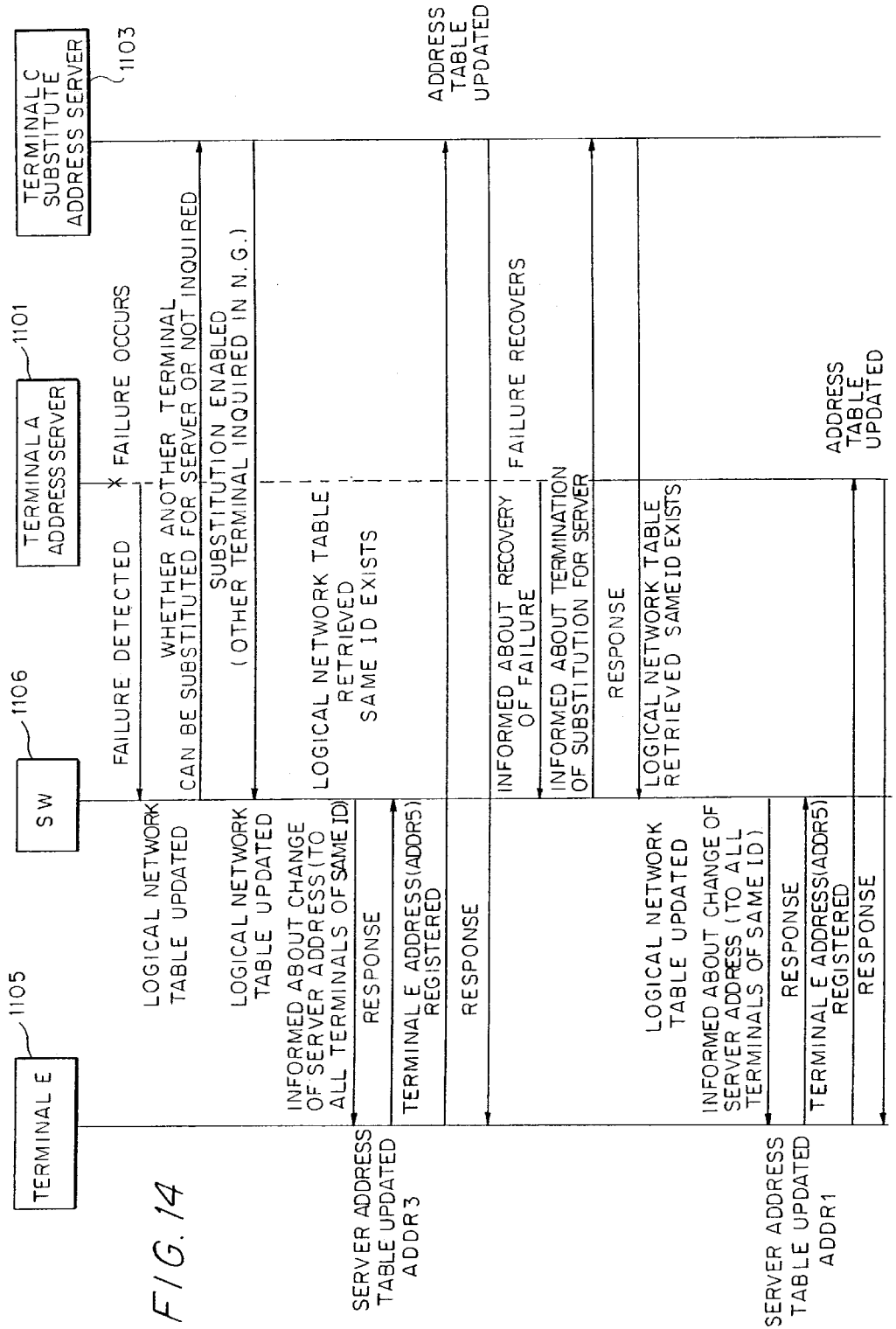
FIG. 14 illustrates the flow of the processing of the system illustrated in FIG. 13.

FIG. 14 illustrates the flow of processing. When a failure occurs in the address server A 1101 (terminal A) and the failure is detected by SW 1106, a table processing section 701 in the address management section 1114 of SW 1106 updates the server address in the entry 1202 of the terminal A 1101 in a logical network table 1201 and the term "failure occurs" is stored in the entry. SW 1106 sequentially selects an arbitrary terminal from the logical network table 1201 and inquiry of the terminal whether it can substitute for the failed address server. In this embodiment, SW 1106 inquires of the terminal C 1103.

When a request processing section 1701 in the address processing section 1111 of the terminal C 1103 receives the inquiry from SW 1106, the terminal C 1103 sends a response showing it can substitute to SW 1106. Whether terminal C 1103 can substitute is dependent upon it being provided with an address table which allows it to respond to an inquiry from a terminal in the logical network. When a request processing section 702 in the address management section 1114 of SW 1106 receives the response from the terminal C 1103, a table processing section 701 retrieves the logical network table 1201 and updates the server address in all of the entries of the same logical network ID (NET1) of the terminal C 1103 from ADDR1 to ADDR3. As a result, the logical network table 1201 is updated as shown in FIG. 15.

The request processing section 702 in the address management section 1114 of SW 1106 informs all of the terminals in the updated entries that the server address has been changed from ADDR1 to ADDR3. In this embodiment, the terminal E 1105 is informed.

When a request processing section 1702 in the address processing section 1113 of the terminal E 1105 receives the information of change, the table processing section 1701 updates server address in a server address table 1703 from ADDR1 to ADDR3. When the terminal E 1105 obtains the address (ADDR3) of the substitute address server (terminal C 1103), it sends a request to register its own address (ADDR5) to the terminal C 1103, the substitute address server.

The terminal C 1103 which receives the request for registration registers the name and address (ADDR5) of the terminal E 1105 in the address table and sends a response to the terminal E 1105. When the terminal E 1105 receives the response from the terminal C 1103, processing for registering the address of the terminal E to the substitute address server (terminal C 1103) is finished.

When the failure of the address server A 1101 (terminal A) has been recovered, the address server A 1101 (terminal A) informs SW 1106 that the failure has been recovered. When the request processing section 702 in the address management section 1114 of SW 1106 receives the information of recovery, the table processing section 701 retrieves a terminal which is provided with the same logical network ID as the terminal A 1101. In the entries of the logical network table 1201. In this embodiment, the terminal C 1103 is retrieved.

The request processing section 702 sends information that the substitution of an address server is finished to the terminal C 1103. In other words, no longer necessary. When the request processing section 1702 in the address processing section 1111 of the terminal C 1103 receives the information of termination substitution, it sends a response to SW 1106. When the request processing section 702 in the address management section 1114 of SW 1106 receives the response, the table processing section 701 retrieves the logical network table 1201 and updates the address of the address server in all of the entries of the same logical network ID (NET1) as the terminal C 1103 from ADDR3 to ADDR1. As a result, the logical network table 1201 is updated as shown in FIG. 16.

The request processing section 702 in the address management section 1114 of SW 1106 informs all of the terminals in the updated entries that the address of the address server has been changed from ADDR3 to ADDR1. In this embodiment, the terminals C 1103 and E 1105 are informed.

When the request processing section 1702 in the address processing section 1113 of the terminal E 1105 receives the information of change, the table processing section 1701 updates server the address of the addresses in the server address table 1703 from ADDR3 to ADDR1. When the terminal E 1105 obtains the address (ADDR1) of the address server A 1101 (terminal A), it sends a request to register its own address (ADDR5) to the address server A 1101 (terminal A).

The address server A 1101 (terminal A) which receives the request for registration registers the name and address (ADDR5) of the terminal E 1105 in the address table and sends a response to the terminal E 1105. When the terminal E 1105 receives the response from the address server A 1101 (terminal A), processing for registering its own address to the address server A 1101 (terminal A) is finished.

For the terminal C 1103, similar processing for informing of the change of an address server and registering the address of the terminal C is also executed. In case data is sent or received between each terminal after the address of an address server is obtained, communication is executed according to the method described in relation to FIG. 10.

In this embodiment, the example in which one or two address servers are provided is described above, however, the present invention can be similarly applied to a communication system including three or more address servers.

The example in which if a failure occurs in an address server, a terminal which belongs to the same logical network as the address server substitutes for the address server is described above. However, the present invention can be similarly applied if another address server which belongs to another logical network substitutes for the address server.

In this embodiment, the case that the terminal C which is selected by the address management section of the switch as a substitute address server can substitute for the failed address server is described above. However, if the terminal C cannot substitute for the failed address server, a terminal which can substitute for the failed address server from the other terminals other than the terminal C is selected as a substitute for the failed address server.

The above-described embodiment of the present invention provides that upon the failure of an address server the address management section of the switch sequentially inquires of each of the other terminals connected to the network whether it can act as a substitute address server for the failed address server until a terminal which can act as a substitute address server is located.

Another embodiment of the present invention would provide that the first address server connected to the switch for a particular subnetwork is designated as the primary address server and the second address server connected to the switch for the same subnetwork is designated as the secondary address server and so on.

A still further embodiment of the present invention would provide that each address server as it is connected to the switch for a subnetwork would indicate whether it is a primary or a secondary address server.

The above-described embodiments of the present invention provide certain efficiencies in the functions to be performed by the switch when a failure occurs in the primary address server. Namely, the switch need not spend time seeking a substitute address server as described above upon the failure of the primary address server. Thus, some time savings are achieved.

Figure 19:
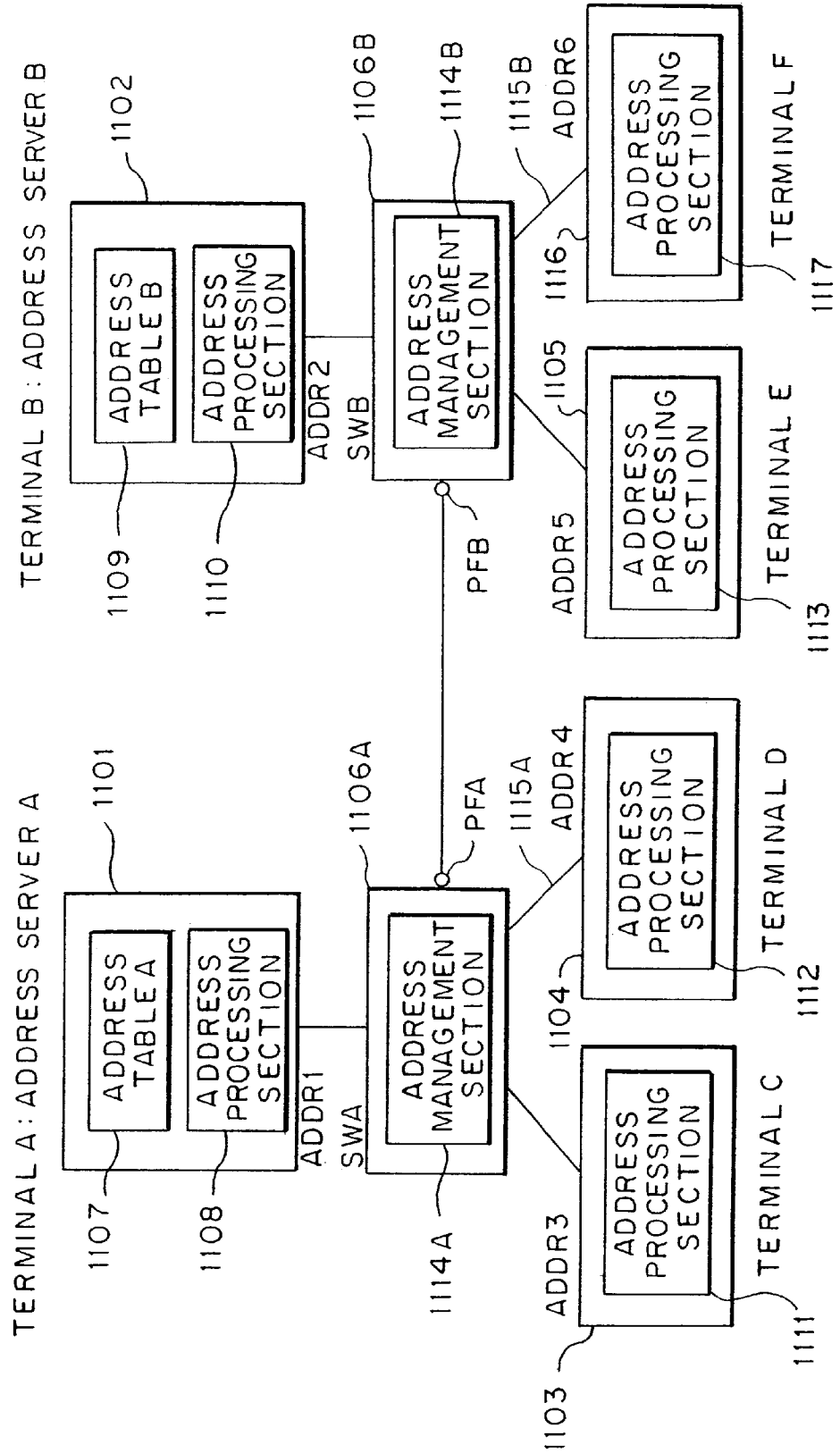
FIG. 19 illustrates a system configuration where the present invention is applied to a system including plural switches.

The present invention can also be applied to a system including plural address servers and logical networks and plural switches as illustrated in FIG. 19. The system of the present invention illustrated in FIG. 19 includes a terminal A 1101 serving as address server A and terminal B 1102 serving as address server B. Address server A 1101 and address server B 1102 are the same as the address server A and the address server B respectively illustrated in FIG. 11. Thus, the description of the functions and construction of the address server A 1101 and the address server B 1102 as illustrated in FIG. 19 is the same as that described with respect to the address server A and the address server B illustrated in FIG. 11.

However, the address server A 1101 and the address server B 1102 differs from that illustrated in FIG. 11 being that address server A 1101 is connected to switch A 1106A and address server B 1102 is connected to switch B 1106B. Each of the switch A 1106A and switch B 1106B are constructed nearly the same as the switch 1106 illustrated in FIG. 11. Therefore, the description of the switch 1106 illustrated in FIG. 11 applies to switch A 1106A and switch B 1106B illustrated in FIG. 19. Switch A 1106A and switch B 1106B illustrated i FIG. 19 differs from the switch 1106 illustrated in FIG. 11 being that switch A 1106A has a port A PT-A and switch B 1106B has a port B PT-B and port A PT-A is connected to port B PT-B. Switch A 1106A is connected to terminal C 1103 and terminal D 1105, and Switch B 1106B is connected to terminal E 1105 and terminal F 1116.

According to the present invention each switch, switch A 1106A and switch B 1106B, having connected thereto various terminals operate independently of the other switch when communication is to be conducted between terminals connected to the switch as described above. However, when communication is to be conducted between a terminal connected to a first one of the switches to a terminal connected to a second one of the switches, the communication is conducted through the connection between port A PT-A and port B PT-B.

Each address management section of each switch illustrated in FIG. 19 includes a logical network table such as that illustrated in FIG. 9. The logical network table has stored therein information identifying the address of each terminal connected to the switch, the logical network to which the terminal is connected and information indicating whether the terminal is an address server or which address server services the terminal.

By use of the present invention, as illustrated in FIG. 19, if for example, terminal C 1103 seeks to send data to terminal E 1105, a request for the address of Terminal E 1105 is sent to switch A 1106A. The switch A 1106A upon receipt of the request determines that the address of terminal E 1105 nor the address of the address server of terminal E 1105 are stored in the logical network table. Thereafter, switch A 1106A sends the request, via port A PT-A and port B PT-B to switch B 1106B. Switch B 1106B responds to the request from switch A 1106A by indicating that the address server for terminal E 1106 is address server B 1102 at the address ADDR2. The terminal C 1103 retrieves the address terminal E 1105 from the address ADDR5 of server B 1102. The terminal C 1103 then sends the data to terminal E 1105 using the address ADDR5 of terminal E 1105.

Another embodiment of the present invention provides that the functions performed by the address server are included in the switch. Such a construction would eliminate the need for additional equipment such as, for example, a separate terminal A which performs the address server functions.

The following effect can be obtained by applying the present invention to a nonbroadcast system:

(1) The address of an address server can be obtained without entering it manually from each terminal.

(2) If plural address servers are installed in a system, an address server which is a target can be selected of the address servers.

(3) If a failure occurs in a currently activated address server, another terminal can take over the function of an address server without the user of each terminal being conscious of the occurrence of a failure and the substitution of another terminal.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A method of managing a server address in a communication system including a server for executing a network service, a plurality of terminals and a switch apparatus for switching a packet among said plurality of terminals, said method comprising the steps of:

sending from said server the address of the server to said switch apparatus;

registering in said switch apparatus the received address of said server in a table;

sending from said switch apparatus the address of said server registered in said table to each terminal for use by said terminal; and sending a request by said terminal to said server requesting said network service using the address received from said switch apparatus.

2. A method according to claim 1, wherein said server is an address server for managing addresses of said plurality of terminals and said switch apparatus.

3. A method according to claim 1, wherein said switch apparatus is an ATM switch apparatus.

4. A switch apparatus for use in a communication system including a server for executing a network service, a plurality of terminals and said switch apparatus for switching data among said plurality of terminals, said switch apparatus comprising:

a plurality of communication ports each being connected to one of said server and said plurality of terminals; and an address management section which manages an address of said server, wherein said address management section registers the address of said server in a table in response to reception of the address of said server sent from server and sends the address of said server registered in said table to each terminal for use by said terminal, and wherein said terminal sends a request to said server requesting said network service using the address received from said switch apparatus.

5. A switch apparatus according to claim 4, wherein said switch apparatus is an ATM switch apparatus which transmits and receives data in an ATM cell format with fixed length.

6. A method of managing a server address in a communication system including a server for executing a network service, a plurality of terminals, and a switch apparatus having a plurality of communication ports each being connected to one of said server and said plurality of terminals and for switching a packet among said plurality of terminals, said method comprising the steps of:

provinding an address table in said switch apparatus;

registering in said switch apparatus the address of said server in the address table;

sending from said switch apparatus the address of said server registered in said address table to each terminal for use by said terminal; and sending a request by said terminal to said server requesting said network service using the address received from said switch apparatus.

7. A method according to claim 6, wherein said server is an address server for managing addresses of said plurality of terminals and said switch apparatus.

8. A method according to claim 6 wherein said switch apparatus is an ATM switch apparatus.

9. A switch apparatus for use in a communication system including a server for executing a network service, a plurality of terminals and said switch apparatus for switching data among said plurality of terminals, said switch apparatus comprising:

a plurality of communication ports each being connected to one of said server and said plurality of terminals; and an address management section having an address table which manages an address of said server, wherein said address management section registers the address of said server in said address table and sends the address of said server registered in said address table to each terminal for use by said terminal, and wherein said terminal sends a request to said server requesting said network service using the address received from said switch apparatus.

10. A switch apparatus according to claim 9, wherein said switch apparatus is an ATM switch apparatus which transmits and receives data in an ATM cell format with fixed length.

* * * * *